United States Patent
Fernandez-Corbaton et al.

(10) Patent No.: US 8,638,771 B2
(45) Date of Patent: Jan. 28, 2014

(54) TRANSMISSION STRUCTURE SUPPORTING MULTI-USER SCHEDULING AND MIMO TRANSMISSION

(75) Inventors: Ivan Jesus Fernandez-Corbaton, Nuremberg (DE); Josef J. Blanz, Wachenheim (DE); Wolfgang Granzow, Heroldsberg (DE)

(73) Assignee: QUALCOMM Incorporated, San Diego, CA (US)

( * ) Notice: Subject to any disclaimer, the term of this patent is extended or adjusted under 35 U.S.C. 154(b) by 1601 days.

(21) Appl. No.: 11/502,882

(22) Filed: Aug. 10, 2006

(65) Prior Publication Data
US 2007/0104150 A1    May 10, 2007

Related U.S. Application Data

(60) Provisional application No. 60/707,672, filed on Aug. 12, 2005.

(51) Int. Cl.
*H04B 7/212* (2006.01)

(52) U.S. Cl.
USPC .......... 370/345; 370/335; 370/337; 370/338; 370/432; 370/344; 455/450; 455/451; 455/452.1; 455/435.3

(58) Field of Classification Search
USPC ......... 370/335, 342, 320, 321, 344, 478, 349, 370/441, 479, 496, 324, 350, 337, 347, 442, 370/277, 280, 328, 329; 375/346; 455/450–452.1, 464, 68, 509, 435.3
See application file for complete search history.

(56) References Cited

U.S. PATENT DOCUMENTS

| | | | |
|---|---|---|---|
| 7,508,804 B2 * | 3/2009 | Das et al. ..................... | 370/342 |
| 2002/0085619 A1 | 7/2002 | Cho et al. | |
| 2002/0167928 A1 * | 11/2002 | Terry et al. .................... | 370/342 |

(Continued)

FOREIGN PATENT DOCUMENTS

| | | |
|---|---|---|
| CN | 1526211 A | 9/2004 |
| EP | 1306985 | 5/2003 |

(Continued)

OTHER PUBLICATIONS

Schotten H D et al: "System Performance gain by interference cancellation in wcdma dedicated and high-speed downlink channels". IEEE Vehicular Tehcnology Conference, vol. 1 of 4, Conf. 56, pp. 316-320, Sep. 24, 2002.

(Continued)

Primary Examiner — Vladimir Magloire
Assistant Examiner — Babar Sarwar
(74) Attorney, Agent, or Firm — Howard Seo

(57) ABSTRACT

Techniques for transmitting data in a manner to support multi-user scheduling, multiple-input multiple-output (MIMO) transmission, and interference cancellation are described. A base station assigns multiple time segments of a transmission time interval (TTI) to at least one terminal, maps data for each terminal to at least one time segment assigned to the terminal, and spreads the data in each time segment with at least one channelization code used in the TTI. A terminal receives an assignment of at least one time segment from among multiple time segments of the TTI, obtains input samples for the at least one time segment, and despreads the input samples with the at least one channelization code used in the TTI.

53 Claims, 11 Drawing Sheets

(56) References Cited

U.S. PATENT DOCUMENTS

| | | |
|---|---|---|
| 2003/0096613 A1 | 5/2003 | Das et al. |
| 2004/0022213 A1 | 2/2004 | Choi et al. |
| 2007/0140105 A1 | 6/2007 | Coon |
| 2008/0101326 A1 | 5/2008 | Zhang et al. |
| 2009/0041024 A1* | 2/2009 | Steudle et al. ............ 370/395.3 |
| 2009/0103497 A1 | 4/2009 | Fernandez-Corbaton et al. |

FOREIGN PATENT DOCUMENTS

| | | |
|---|---|---|
| EP | 1335506 A2 | 8/2003 |
| EP | 1355442 | 10/2003 |
| EP | 1355442 A1 * | 10/2003 |
| EP | 1505745 | 2/2005 |
| JP | 09327073 | 12/1997 |
| JP | 2004530379 | 9/2004 |
| JP | 2005518141 | 6/2005 |
| JP | 2009505518 | 2/2009 |
| KR | 20030092894 | 12/2003 |
| KR | 20050000683 | 1/2005 |
| RU | 2234193 C2 | 8/2004 |
| WO | WO02093784 A1 | 11/2002 |
| WO | 03069824 A2 | 8/2003 |
| WO | WO2004022213 A1 | 3/2004 |
| WO | 2005057810 | 6/2005 |
| WO | 2006099326 A1 | 9/2006 |
| WO | WO2006111785 A1 | 10/2006 |

OTHER PUBLICATIONS

International Search Report—PCT/US06/031728—International Search Authority—May 23, 2007.
Written Opinion—PCT/US06/031728—International Search Authority—May 23, 2007.
International Preliminary Report on Patentability—PCT/US06/031728—The International Bureau of WIPO, Geneva, Switzerland—Feb. 12, 2008.
European Search Report—EP10157845, Search Authority—Hauge Patent Office, Apr. 12, 2010.
3GPP, Physical channels and mapping of transport channels onto physical channels (FDD)(Release 6), 3GPP TS 25.211, 3GPP, Jun. 2005, V6.5.0,p. 27, 28, 35, 36, 39, 40, URL, http://www.3gpp.org/ftp/Specs/archive/25_series/25.211/25211-650.zip.
3GPP TS 25.213 V6.3.0, 3rd Generation Partnership Project; Technical Specification Group Radio Access Network; Spreading and modulation (FDD), (Release 6), (Jun. 2005).

* cited by examiner

US 8,638,771 B2

TRANSMISSION STRUCTURE SUPPORTING MULTI-USER SCHEDULING AND MIMO TRANSMISSION

CLAIM OF PRIORITY UNDER 35 U.S.C. §119

The present Application for Patent claims priority to Provisional Application Ser. No. 60/707,672, entitled "STRUCTURE FOR SUCCESSIVE INTERFERENCE CANCELLATION IN A MIMO-CDM DOWNLINK," filed Aug. 12, 2005, assigned to the assignee hereof, and expressly incorporated herein by reference.

BACKGROUND

I. Field

The present disclosure relates generally to communication, and more specifically to techniques for transmitting data in a wireless communication network.

II. Background

A wireless multiple-access communication network can concurrently communicate with multiple terminals on the downlink and uplink. The downlink (or forward link) refers to the communication link from the base stations to the terminals, and the uplink (or reverse link) refers to the communication link from the terminals to the base stations. Multiple terminals may simultaneously receive signaling and data on the downlink and/or transmit signaling and data on the uplink. This may be achieved by multiplexing the transmissions to be orthogonal to one another (e.g., on the downlink) and/or by controlling the transmit power of each transmission to achieve a desired received signal quality for the transmission while reducing interference to other transmissions (e.g., on the uplink).

A base station may transmit data to a number of terminals within its coverage area. To improve performance, it is desirable for the base station to be able to schedule a variable number of terminals in each transmission time interval (TTI). A TTI is the smallest unit of time over which a data packet can be scheduled for transmission to one or more terminals. To further improve performance, the base station may utilize multiple antennas to transmit multiple data streams simultaneously to the terminals. These data streams are distorted by the radio environment and act as interference to one another at each recipient terminal. The interference hinders each terminal's ability to recover the data stream(s) sent for the terminal.

There is therefore a need in the art for techniques to efficiently transmit data to multiple terminals.

SUMMARY

Techniques for transmitting data in a manner to support multi-user scheduling, multiple-input multiple-output (MIMO) transmission, and interference cancellation are described herein. The techniques may improve performance.

According to an exemplary embodiment, an apparatus is described which includes at least one processor and a memory. The processor(s) assign multiple time segments of a TTI to at least one terminal, map data for each terminal to at least one time segment assigned to the terminal, and spread the data in each time segment with at least one channelization code used in the TTI.

According to another exemplary embodiment, an apparatus is described which includes at least one processor and a memory. The processor(s) receive an assignment of at least one time segment from among multiple time segments of a TTI, obtain input samples for the at least one time segment, and despread the input samples with at least one channelization code used in the TTI.

Various aspects and exemplary embodiments of the invention are described in further detail below.

DETAILED DESCRIPTION

The word "exemplary" is used herein to mean "serving as an example, instance, or illustration." Any exemplary embodiment described herein as "exemplary" is not necessarily to be construed as preferred or advantageous over other exemplary embodiments.

Figure 1:
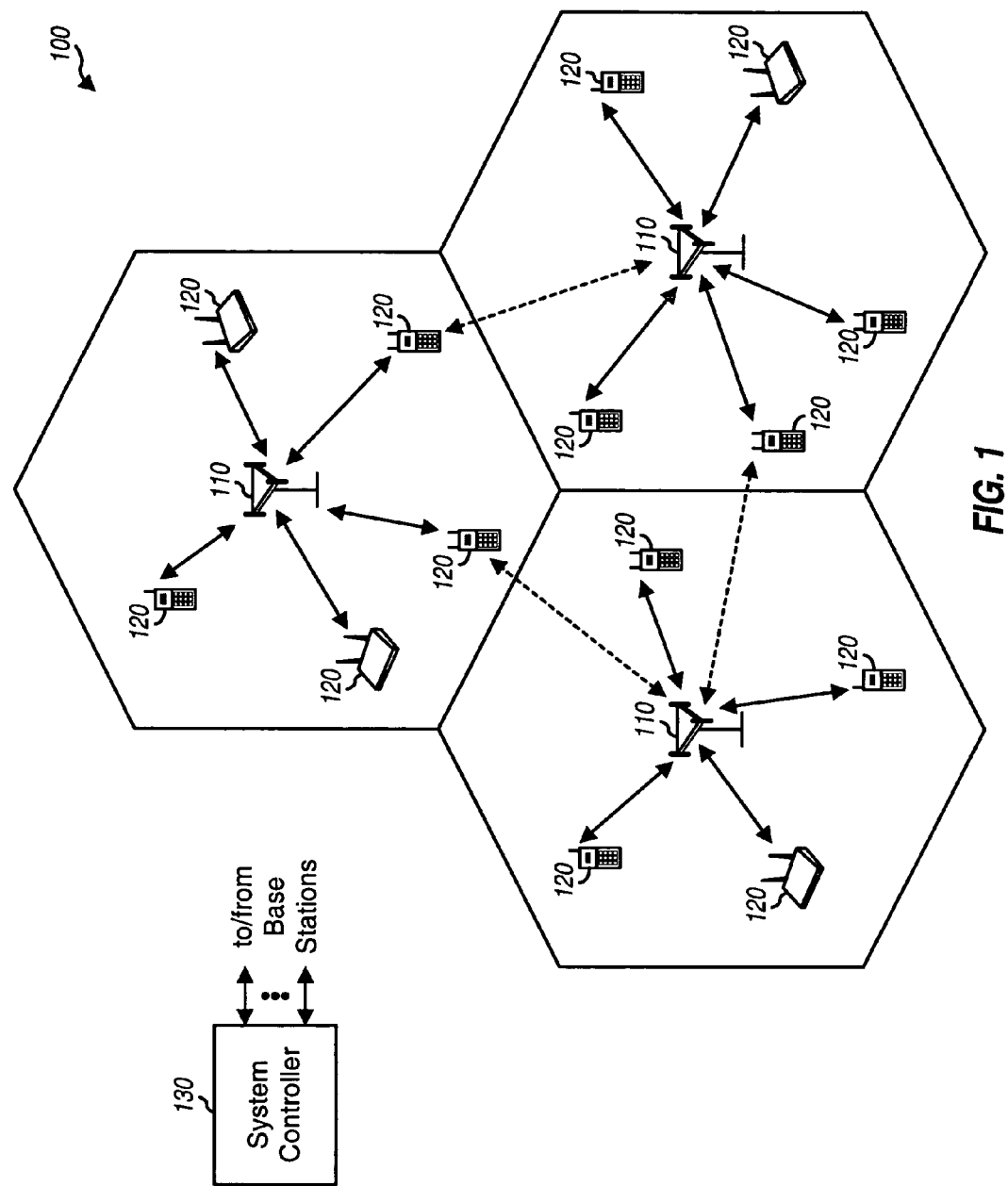
FIG. 1 shows a wireless communication network.

FIG. 1 shows a wireless communication network 100 with multiple base stations 110 and multiple terminals 120. A base station is generally a fixed station that communicates with the terminals and may also be referred to as a Node B, an access point, a base transceiver subsystem (BTS), or some other terminology. Each base station 110 provides communication coverage for a particular geographic area and supports communication for the terminals located within the coverage area. A system controller 130 couples to base stations 110 and provides coordination and control for these base stations. System controller 130 may be a single network entity or a collection of network entities.

Terminals 120 may be dispersed throughout the system, and each terminal may be stationary or mobile. A terminal may also be referred to as a user equipment (UE), a mobile station (MS), an access terminal (AT), a subscriber unit, a station (STA), or some other terminology. A terminal may be a cellular phone, a wireless device, a personal digital assistant (PDA), a handheld device, a wireless modem, a laptop computer, and so on. A terminal may actively communicate with a base station (as shown by a solid line with double arrows) or may receive pilot and exchange signaling with a base station (as shown by a dashed line with double arrows). The terms "terminal" and "user" are used interchangeably herein.

The techniques described herein may be used for various wireless communication networks such as Code Division Multiple Access (CDMA) networks, Time Division Multiple Access (TDMA) networks, Frequency Division Multiple Access (FDMA) networks, and Orthogonal FDMA (OFDMA) networks. The terms "network" and "system" are often used interchangeably. A CDMA network may implement a radio technology such as Wideband-CDMA (W-CDMA, UMTS), cdma2000, and so on. cdma2000 covers IS-2000, IS-856 and IS-95 standards. A TDMA network may implement a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). The techniques may be used for downlink transmissions as well as uplink transmissions. For clarity, the techniques are described below for downlink transmissions in a Universal Mobile Telecommunication System (UMTS) network that utilizes W-CDMA.

In UMTS, data for a terminal is processed as one or more transport channels at a higher layer. The transport channels may carry data for one or more services, e.g., voice, video, packet data, and so on. The transport channels are mapped to physical channels at a physical layer. The physical channels (except for a Synchronization Channel (SCH)) are channelized with different channelization codes and are orthogonal to one another in code domain. 3GPP Release 5 and later supports High-Speed Downlink Packet Access (HSDPA), which is a set of channels and procedures that enable high-speed packet data transmission on the downlink.

Table 1 lists downlink and uplink channels used for HSDPA and provides a short description for each channel. A radio link for a terminal may include zero, one, or multiple HS-SCCHs and zero, one, or multiple HS-PDSCHs.

TABLE 1

| Link | Channel | Channel Name | Description |
|---|---|---|---|
| Downlink | HS-SCCH | Shared Control Channel for HS-DSCH | Carry signaling for HS-PDSCH. |
| Downlink | HS-PDSCH | High Speed Physical Downlink Shared Channel | Carry packets for different terminals. |
| Uplink | HS-DPCCH | Dedicated Physical Control Channel for HS-DSCH | Carry feedback for downlink transmission in HSDPA. |

Figure 2:
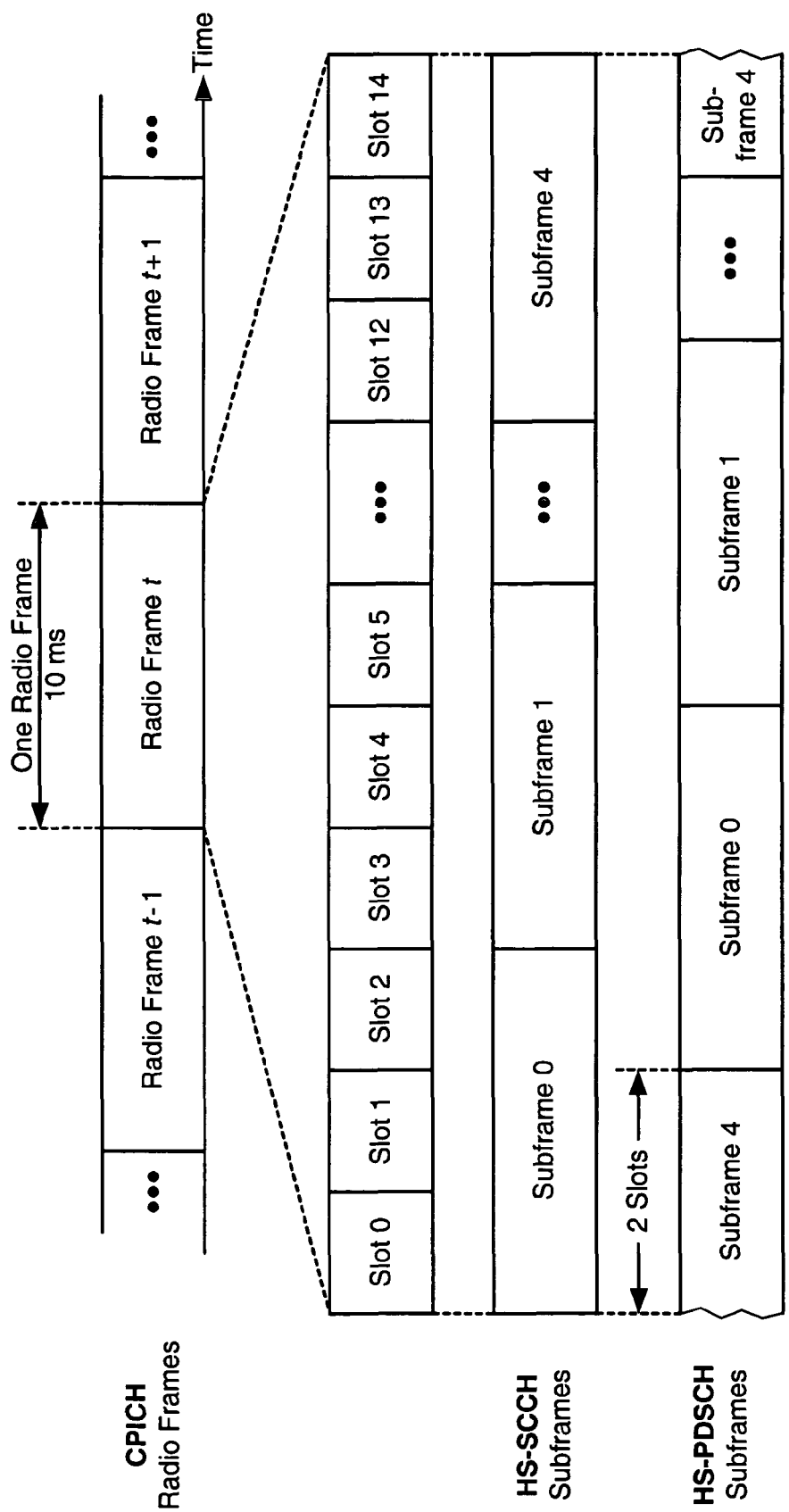
FIG. 2 shows a frame format in W-CDMA.

FIG. 2 shows a frame format in W-CDMA. The timeline for transmission is divided into radio frames. The radio frames on the downlink are defined relative to the timing of a Common Pilot Channel (CPICH), which has the same timing as the SCH. Each radio frame has a duration of 10 milliseconds (ms) and is identified by a 12-bit system frame number (SFN). Each radio frame is further partitioned into 15 slots, which are labeled as slot 0 through slot 14. Each slot has a duration of 0.667 ms and includes 2560 chips at 3.84 Mcps. Each radio frame is also partitioned into five subframes 0 through 4. Each subframe has a duration of 2 ms and spans 3 slots. The subframes of the HS-SCCH are time aligned with the radio frames of the CPICH. The subframes of the HS-PDSCH are shifted to the right (or delayed) by two slots relative to the subframes of the HS-SCCH.

HSDPA uses a TTI of 2 ms, which is one subframe. The TTI governs the following operational aspects of HSDPA.
Terminals are scheduled for transmission in each TTI.
A packet transmission or retransmission for a terminal is sent in one TTI.
Acknowledgement (ACK) or negative acknowledgement (NAK) is sent after each packet re/transmission.
Channel quality indicator (CQI) is reported on a TTI by TTI basis, with possible reduction of reporting rate by skipping TTIs in a regular manner (for duty cycle less than 100%).

Figure 3:
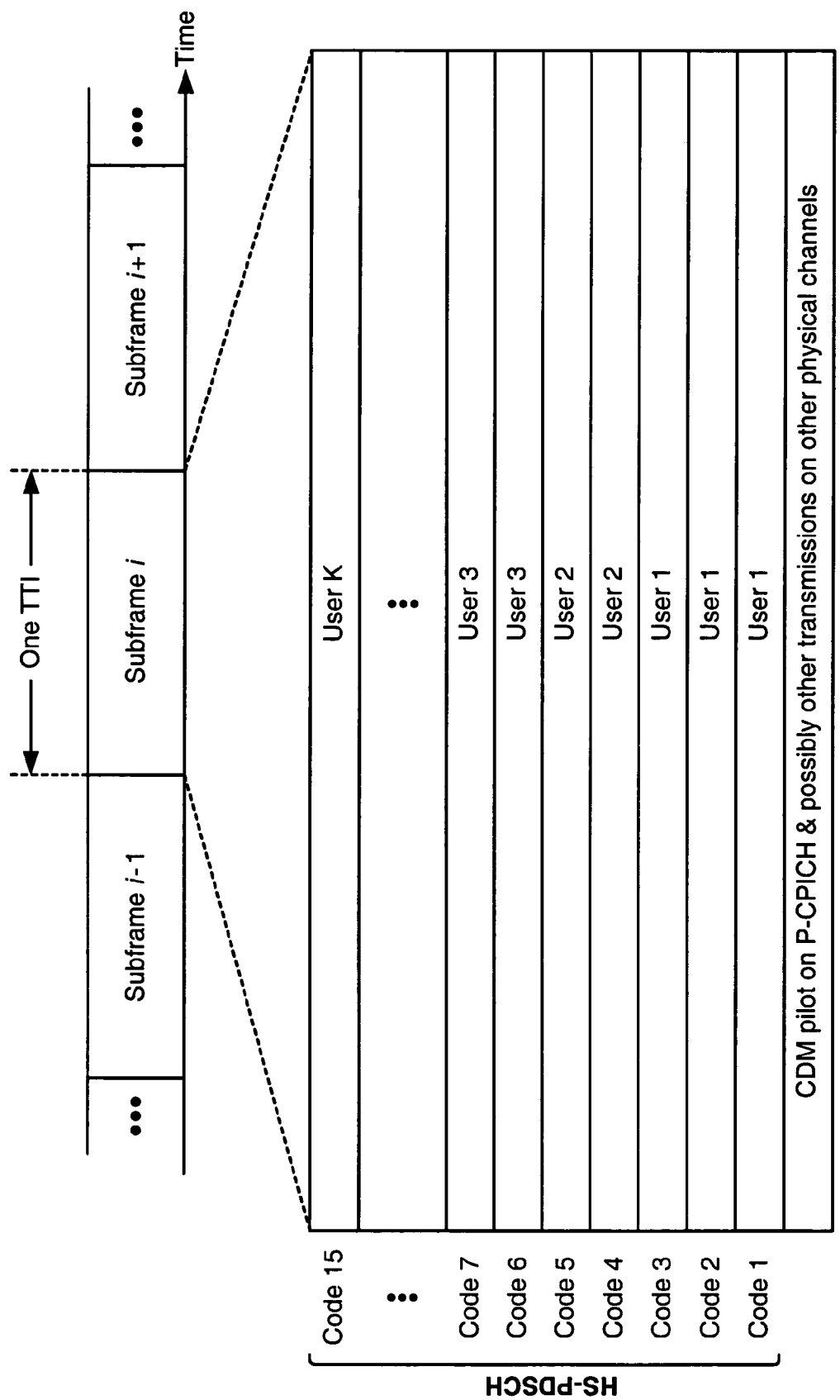
FIG. 3 shows a CDM format for the HS-PDSCH in HSDPA.

FIG. 3 shows a code division multiplex (CDM) format/structure for the HS-PDSCH in HSDPA. The CDM format is used in 3GPP Release 5 and later. Up to 15 channelization codes with a spreading factor of 16 (SF=16) may be used for HSDPA. The channelization codes are orthogonal variable spreading factor (OVSF) codes that are generated in a structured manner. The spreading factor is the length of a channelization code. A data symbol is spread with a channelization code to generate SF chips for the data symbol. The channelization codes for HSDPA may be assigned to terminals in each TTI based on various factors such as data rate requests of the terminals, the number of available channelization codes, the available transmit power for HSDPA, and so on. In the example shown in FIG. 3, 15 channelization codes are used for HSDPA, user 1 is assigned channelization codes 1, 2 and 3, user 2 is assigned channelization codes 4 and 5, user 3 is assigned channelization codes 6 and 7, and so on, and user K is assigned channelization code 15.

HSDPA may be considered as having up to 15 HS-PDSCHs, with each HS-PDSCH corresponding to a different SF=16 channelization code. HSDPA may also be considered as having a single HS-PDSCH with up to 15 channelization codes. The following description assumes the former case, with up to 15 HS-PDSCHs being available for HSDPA.

FIG. 3 also shows a Primary Common Pilot Channel (P-CPICH) that carries a continuous CDM pilot that is spread with a fixed channelization code of $C_{ch,256,0}$. Pilot is data (e.g., a predefined bit sequence) that is known a priori by the base stations and the terminals. Pilot may also be referred to as reference, training signal, preamble, beacon, and so on. The channelization code for the P-CPICH has a spreading factor of 256 (SF=256) and is a sequence of all zeros. The P-CPICH is sent in each slot. Other transmissions may also be sent on other physical channels (e.g., the HS-SCCH) with other channelization codes. One channelization code of SF=16 ($C_{ch,16,0}$) is not used for HS-PDSCH transmission as this would collide with the transmission of the P-CPICH on $C_{ch,256,0}$, and other physical channels.

As shown in FIG. 3, multiple terminals may be assigned different channelization codes in a given TTI for HSDPA. Different sets of terminals may be assigned the channelization codes in different TTIs. A given terminal may be assigned any number of channelization codes in each TTI, and the assignment for the terminal may vary from TTI to TTI.

As shown in FIG. 3, HSDPA utilizes CDM to simultaneously transmit packets to different terminals in a given TTI. The channelization codes and transmit power are used by the base station as assignable resources to simultaneously serve multiple terminals. HSDPA supports multi-user scheduling, which refers to the ability to schedule multiple terminals in a given TTI. Multi-user scheduling may provide certain advantages over single-user scheduling, which can schedule a single terminal in a TTI. For example, the ability to schedule many terminals with small payloads in the same TTI is beneficial for efficient handling of low bit-rate delay-sensitive applications such as voice-over-Internet Protocol (VoIP).

MIMO transmission may be used to further improve performance. MIMO utilizes multiple transmit antennas and multiple receive antennas to achieve increased dimensionality, which may provide higher spectral efficiencies and higher maximum data rates per terminal.

For MIMO transmission on the downlink, a base station may transmit multiple (M) data streams simultaneously from multiple (T) transmit antennas to multiple receive (R) antennas at a terminal, where M≤min{T, R}, while reusing all allocated channelization codes. The data streams interfere with one another at the terminal. The terminal may perform MIMO detection to separate out the data streams. To improve performance, the terminal may perform successive interference cancellation (SIC). With SIC, the terminal first recovers one data stream, then estimates and subtracts the interference caused by this data stream, then recovers the next data stream in similar manner. By subtracting out the interference from each data stream that is recovered, the signal-to-interference-and-noise ratio (SINR) of each remaining data stream improves. It can be shown that minimum mean square error (MMSE) detection in combination with SIC (MMSE-SIC) can theoretically achieve optimal performance.

It is desirable to support both multi-user scheduling and SIC. However, the use of CDM for HSDPA may limit the benefits achievable for SIC. The complete benefits of SIC may be obtained when all available channelization codes are allocated to one terminal and by canceling the contributions of all channelization codes in a recovered data stream from the remaining data streams. If multiple terminals are scheduled in a given TTI with separate data streams that are multiplexed by CDM, then each terminal would need to demodulate and decode the transmission for that terminal as well as the other transmissions for other terminals in order to estimate and cancel the interference from all channelization codes. It may be impractical or even impossible to require a terminal to recover the transmissions for other terminals. Hence, the amount of interference that can be canceled may be limited by using the CDM format shown in FIG. 3.

Figure 4A:
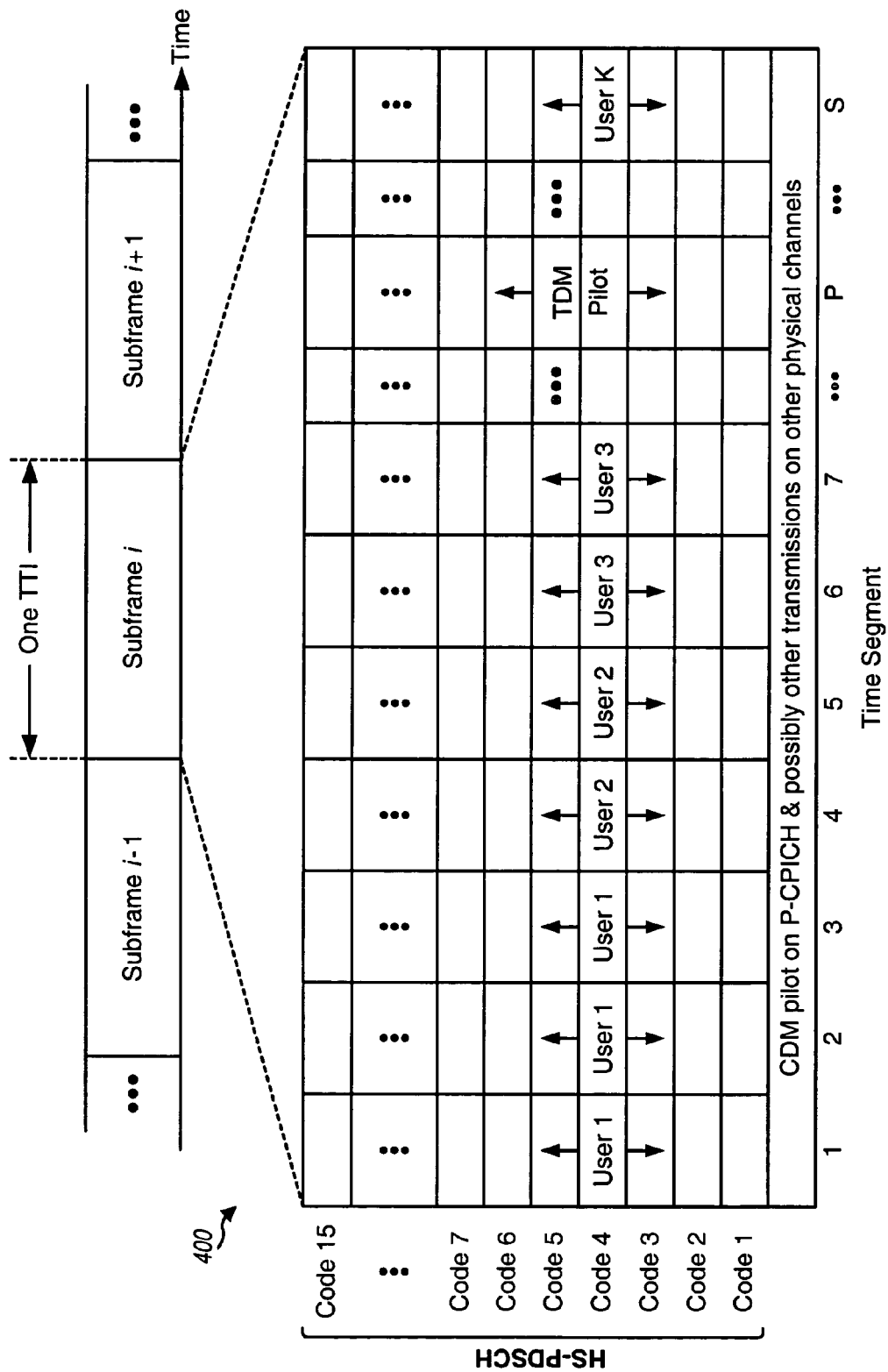
FIG. 4A shows a TDM format for the HS-PDSCH in HSDPA.

FIG. 4A shows an exemplary embodiment of a time division multiplex (TDM) format/structure 400 for the HS-PDSCH in HSDPA. In this exemplary embodiment, a TTI is partitioned into multiple (S) time segments 1 through S, where in general S may be any value. In an exemplary embodiment, S is equal to 16, and each time segment includes 480 chips per channelization code at 3.84 Mcps or 30 symbols for SF=16. This exemplary embodiment of S=16, with 15 time segments being usable for data, preserves the existing rate matching table, which may simplify coding and decoding. In another exemplary embodiment, S is equal to 15, and each time segment includes 512 chips or 32 symbols for SF=16. Other values may also be used for S. The P-CPICH may also be sent in each slot to retain backward compatibility with the CDM format shown in FIG. 3.

In an exemplary embodiment, which is referred to as full assignment, each time segment is assigned to only one terminal. The S time segments of a TTI may be assigned to one or multiple terminals. All of the channelization codes for HSDPA may be used in each of the S time segments. A terminal assigned with a given time segment is allocated all channelization codes for HSDPA in that time segment. In the example shown in FIG. 4A, user 1 is assigned time segments 1, 2 and 3, user 2 is assigned time segments 4 and 5, user 3 is assigned time segments 6 and 7, and so on, and user K is assigned time segment S. In general, each terminal may be assigned any number of time segments in a given TTI, up to the number of time segments available for data transmission.

Figure 4B:
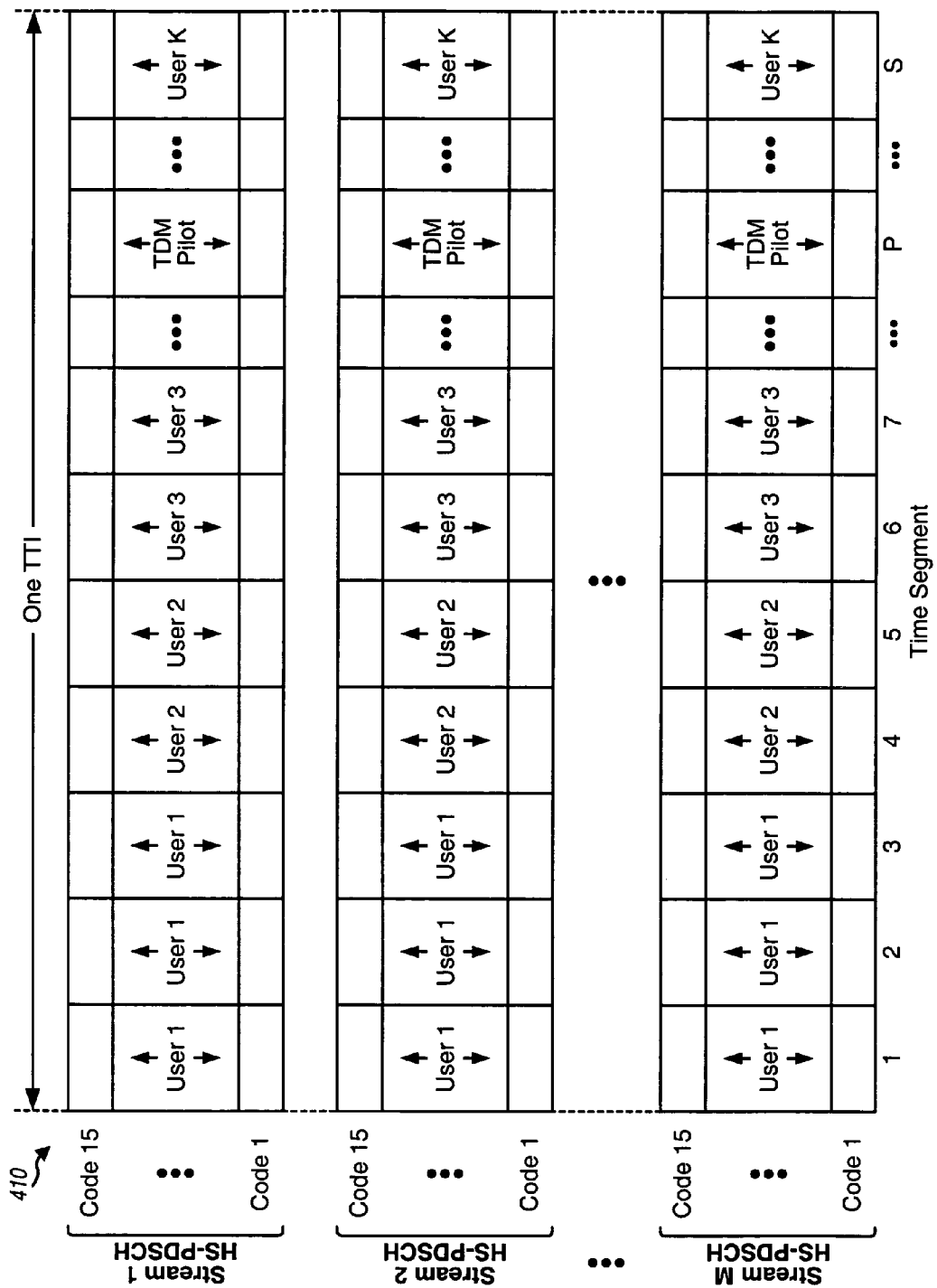
FIG. 4B shows a TDM format for the HS-PDSCH in HSDPA with MIMO.

FIG. 4B shows an exemplary embodiment of a TDM format 410 for the HS-PDSCH in HSDPA with MIMO. Multiple (M) data streams may be sent simultaneously in a TTI to one or multiple terminals. Resources such as time segments, channelization codes, and transmit power may be assigned for each data stream. In the full assignment embodiment, a terminal may be assigned the same time segment across all of the data streams. This exemplary embodiment allows the base station to schedule up to S terminals in a TTI while enabling each terminal to perform SIC over all channelization codes for HSDPA plus the known pilot channel and other physical channels that can be decoded by the terminal. In the example shown in FIG. 4B, user 1 is assigned time segments 1, 2 and 3 across all M data streams, user 2 is assigned time segments 4 and 5 across all M data streams, user 3 is assigned time segments 6 and 7 across all M data streams, and so on, and user K is assigned time segment S across all M data streams.

In another exemplary embodiment, which is referred to as partial assignment, a given time segment may be assigned to multiple terminals. The partial assignment may be performed in various manners. In one embodiment, each terminal may be assigned a subset of the channelization codes for HSDPA across the M data streams. In another embodiment, each terminal may be assigned all channelization codes for HSDPA for a subset (e.g., one) of the M data streams. In yet another embodiment, each terminal may be assigned a subset of the channelization codes for HSDPA for a subset of the data streams. In general, a terminal may be assigned any number of channelization codes in each of the M data streams within any time segment. Partial assignment allows the base station to schedule terminals with finer granularly in a TTI. Partial assignment may be used when scheduling more terminals with smaller payloads is preferred over scheduling fewer terminals with higher data rates, e.g., when VoIP is used by many terminals.

In yet another exemplary embodiment, a combination of full and partial assignments may be used for a given TTI. For example, full assignment may be used for some time segments (e.g., for terminals with SIC capability and/or larger data payload) and partial assignment may be used for other time segments (e.g., for terminals without SIC capability and/or with smaller data payload).

In an exemplary embodiment, one or more time segments are used to send a TDM pilot. A time segment used for TDM pilot is referred to as a pilot segment. The TDM pilot may be sent on the HS-PDSCH among with the CDM pilot on the P-CPICH. The TDM pilot may be transmitted in various manners. In an exemplary embodiment, the TDM pilot is transmitted using all channelization codes for HSDPA. The TDM pilot may be transmitted with the same transmit power per channelization code as the HSDPA data carried on HS-PDSCH, and the total transmit power for the TDM pilot would then be equal to the total transmit power for HSDPA data. The number of time segments to use for the TDM pilot may be selected based on a tradeoff between the benefits (e.g., improvement in throughput) achievable with the TDM pilot versus the overhead to send the TDM pilot.

In general, any of the S time segments may be used as a pilot segment. The TDM pilot may be sent in the first time segment of a TTI to allow all terminals to use the TDM pilot to recover the HSDPA data sent in subsequent time segments of the TTI. The TDM pilot may also be sent in a middle time segment of a TTI to be approximately equal distances over time to the two end time segments of the TTI. The TDM pilot may also be sent in other time segments.

In the exemplary embodiments shown in FIGS. 4A and 4B, the TDM pilot is transmitted in one time segment. If S=16, then the overhead for the TDM pilot is 1/16=6.25%. In an exemplary embodiment, the TDM pilot is fixed and transmitted in one or more designated time segments of each TTI. In another exemplary embodiment, the TDM pilot is configurable and (1) may or may not be transmitted in a given TTI, (2) may be transmitted in a selectable number of time segments of a TTI, and/or (3) may be transmitted with different number of channelization codes. The configuration of the TDM pilot may be varied from TTI to TTI, from radio frame to radio frame, or more slowly.

The terminals may use the TDM pilot for various purposes such as channel estimation, channel quality measurement, and so on. A terminal may derive channel gain estimates for all data streams at all receive antennas (or between all transmit antennas and all receive antennas) based on the TDM pilot. The terminal may use the channel gain estimates to derive equalizer taps, spatial filter matrices, and so on. The terminal may then process the received signals with the equalizer taps and/or spatial filter matrices to recover the transmitted data streams.

The terminal may also measure the received SINR based on the TDM pilot, compute CQI (Channel Quality Indicator) based on the SINR estimate, and send the CQI to the base station. The terminals may also measure the received SINR based on the CDM pilot sent on the P-CPICH. However, the CQI computed based on the SINR achieved over the TDM pilot (or the pilot SINR) may be a better reflection of the SINR achieved over the HSDPA data (or the data SINR) since the TDM pilot is sent with the same channelization codes used for the HSDPA data and at the same power level as the HSDPA data. The base station knows the amount of transmit power used for HSDPA in each TTI and can approximately adjust the reported CQI to account for any changes in transmit power and/or code assignment from the time the terminal computes the pilot SINR to the time the base station sends HSDPA data using the reported CQI. A more accurate reported CQI, which may be obtained through the TDM pilot, may enable more accurate rate selection, which may improve performance of delay sensitive traffic as well as other traffic. The more accurate reported CQI may also support use of higher order modulation schemes such as, e.g., 64-QAM and 256-QAM.

The terminal may also determine a traffic-to-pilot ratio, which is a ratio of traffic power to pilot power, based on the TDM pilot. The terminal may derive a scalar based on, e.g., as a square root of, the traffic-to-pilot ratio. The terminal may multiply symbol estimates with the scalar to achieve proper scaling for the symbol estimates for subsequent decoding.

The terminal may use the SINR estimate for MIMO detection and/or demodulation. For example, the terminal may compute log likelihood ratios (LLRs) for code bits using the SINR estimate and may then decode the LLRs to obtain decoded data. A more accurate SINR estimate, which may be obtained through the TDM pilot, may result in more accurate LLR computation and improved demodulation and decoding performance, especially for modulation schemes with non-constant power constellations such as 16-QAM and 64-QAM.

The TDM pilot for HSDPA may be transmitted concurrently with other data and/or control channels, e.g., the HS-SCCH. The TDM pilot resembles a pure TDM pilot burst, which has been shown to provide improved training quality over a CDM pilot. The possible performance improvement provided by the TDM pilot may justify transmission of the TDM pilot despite the overhead penalty.

Figure 5:
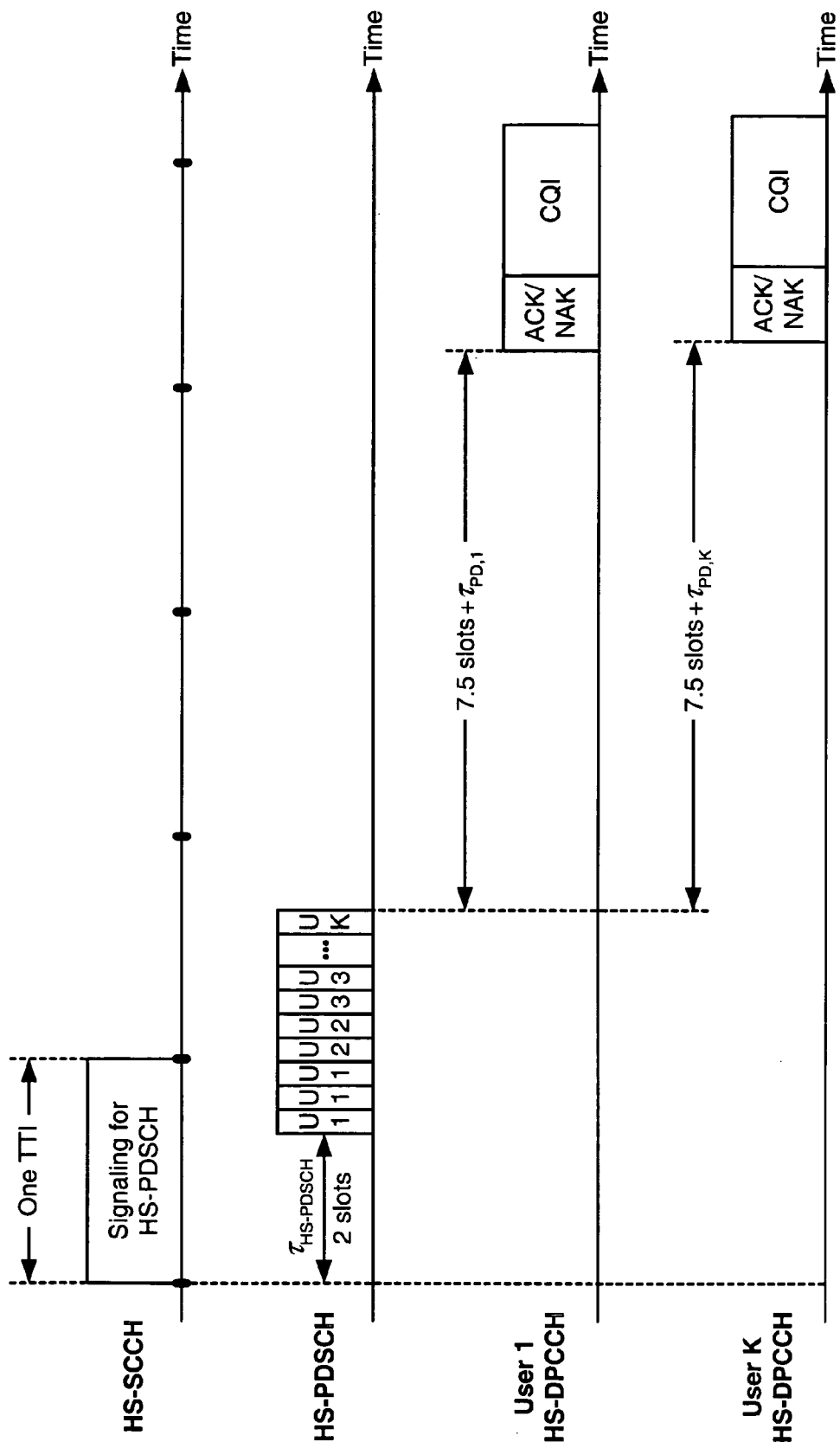
FIG. 5 shows an exemplary transmission for HSDPA with the TDM format.

FIG. 5 shows an exemplary transmission for HSDPA with TDM format 400 in FIG. 4A. The base station schedules terminals for data transmission on the HS-PDSCH in a TTI. The base station sends signaling/control information for each scheduled terminal on the HS-SCCH. The signaling for each scheduled terminal indicates the specific time segment(s) assigned to that terminal in the TTI. The base station sends HSDPA data for the scheduled terminals in their assigned time segments on the HS-PDSCH. The data transmission on the HS-PDSCH is delayed by $\tau_{HS\text{-}PDSCH}=2$ slots from the corresponding signaling transmission on the HS-SCCH.

Each terminal that might receive data on the HS-PDSCH in the TTI processes the HS-SCCH to determine whether signaling has been sent for that terminal. Each scheduled terminal processes the TDM pilot (if sent) and further processes the assigned time segment(s) to recover the HSDPA data sent for the terminal. Each scheduled terminal sends an ACK if a packet sent in the current TTI is decoded correctly and sends a NAK otherwise. Each terminal may also estimate the pilot SINR based on the TDM pilot (if sent) and/or the CDM pilot, computes the CQI based on the SINR estimate, and sends the CQI along with the ACK/NAK on the HS-DPCCH. The feedback transmission on the HS-DPCCH is delayed by approximately 7.5 slots from the end of the corresponding data transmission on the HS-PDSCH, as received at the terminal. Terminals 1 through K have propagation delays of $\tau_{PD,1}$ through $\tau_{PD,K}$, respectively, to the base station. The HS-DPCCHs for terminals 1 through K are thus delayed by approximately 7.5 slots+$\tau_{PD,1}$ through 7.5 slots+$\tau_{PD,K}$, respectively, relative to the HS-PDSCH at the base station. Terminals that are not scheduled in the current TTI may also send ACK/NAK for a prior packet transmission and CQI for the current TTI on the HS-DPCCHs.

The base station may support both the TDM format shown in FIG. 4A and the CDM format shown in FIG. 3. The base station may select either the TDM or CDM format in each TTI and may send signaling for the scheduled terminals on the HS-SCCH. Each scheduled terminal may know whether the TDM or CDM format is being used based on the capability of the terminal, configuration information exchanged earlier (e.g., during call setup), signaling sent on the HS-SCCH, and so on. For example, legacy terminals that do not support the TDM format may assume that HSDPA data is sent using the CDM format. New terminals that support both the TDM and CDM formats may be informed (e.g., by higher layer signaling) which format will be used for the current TTI, the current radio frame, or the entire call.

It is desirable to use the same signaling format on the HS-SCCH for both the TDM and CDM formats. The signaling on the HS-SCCH includes a number of parameters, one of which is a 7-bit channelization-code-set (CCS) parameter. For the CDM format, the CCS parameter indicates the starting channelization code and the number of consecutive channelization codes assigned to a terminal in the current TTI. In an exemplary embodiment, the CCS parameter is also used to convey the assignment of time segments for the TDM format. The interpretation of the CCS bits would be different depending on whether the TDM or CDM format is used for the HS-PDSCH.

Figure 6:
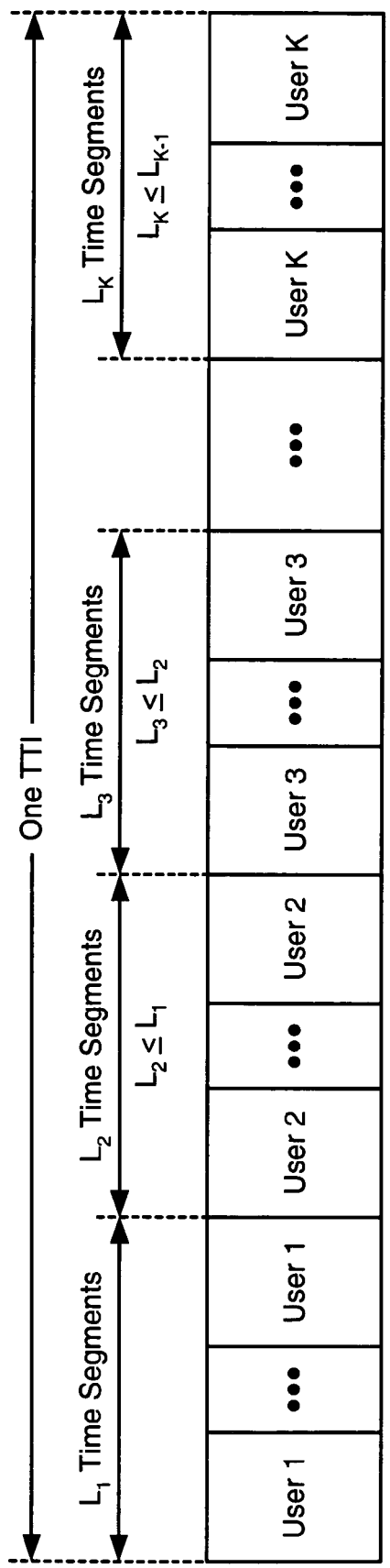
FIG. 6 shows assignment of time segments in a TTI to terminals.

FIG. 6 shows an exemplary embodiment of assigning time segments in a TTI to terminals. A terminal may be assigned one or more consecutive time segments in the TTI. In an exemplary embodiment, to reduce signaling, the terminals may be assigned time segments in a sequential order based on the number of assigned time segments. For example, the terminal with the most number of time segments may be assigned first in the TTI, the terminal with the second most number of time segments may be assigned next, and so on, and the terminal with the least number of time segments may be assigned last in the TTI. In the example shown in FIG. 6, user 1 is assigned the first $L_1$ time segments, user 2 is assigned the next $L_2$ time segments, where $L_2 \leq L_1$, user 3 is assigned the next $L_3$ time segments, where $L_3 \leq L_2$, and so on, and user K is assigned the last $L_K$ time segments, where $L_K \leq L_{K-1}$.

In the exemplary embodiment shown in FIG. 6, the maximum of time segments that can be assigned to a terminal is dependent on the starting time segment for the terminal.

If the starting time segment is the first time segment of the TTI, then the terminal may be assigned 1 to S time segments.

If the starting time segment is the second time segment, then the terminal may be assigned one time segment since another terminal with its starting point at the first time segment was assigned only one time segment.

If the starting time segment is the third time segment, then the terminal may be assigned either one or two time segments.

If the starting time segment is the N-th time segment, where $1 < N \le S$, then the terminal may be assigned from one to min $\{N-1, S-N\}$ time segments. The limitation of $N-1$ is due to the sequential order of assigning time segments. The limitation of $S-N$ is due to the finite length of the TTI. For a terminal starting in the second half of the TTI, the limitation of $S-N$ is more restrictive than the limitation of $N$.

A total of 15 time segments in a TTI may be assignable to the terminals for HSDPA if (a) S=16 and the TDM pilot is sent in one time segment or (b) S=15 and the TDM pilot is not sent. For the assignment embodiment shown in FIG. 6, if 15 time segments are assignable in a TTI, then there are 71 possible assignments of time segments. The time segment assignment for a terminal may be conveyed with the 7-bit CCS parameter. In this case, 71 out of 128 possible values for the CCS parameter may be used to convey the time segment assignment. The 128−71=57 remaining values may be used for other signaling.

In another exemplary embodiment, the terminals may be assigned one or more consecutive time segments in the reverse order shown in FIG. 6. For example, the terminal with the least number of time segments may be assigned first in the TTI, the terminal with the second least number of time segments may be assigned next, and so on, and the terminal with the most number of time segments may be assigned last in the TTI. In yet another exemplary embodiment, a terminal may be assigned one or more consecutive time segments anywhere in a TTI. This exemplary embodiment is similar to the manner in which one or more consecutive channelization codes in a code tree may be assigned to a terminal for the CDM format shown in FIG. 3. The signaling for a terminal may then indicate the starting time segment and the number of consecutive time segments assigned to the terminal. If a total of 15 time segments are assignable in a TTI, then there are 120 possible assignments of time segments. The time segment assignment for a terminal may be conveyed with the 7-bit CCS parameter. In this case, 128−120=8 remaining values may be used for other signaling.

As noted above, a combination of full and partial assignments may be used for a given TTI. To reduce signaling, some commonly used partial assignments may be defined for the (e.g., 57) remaining values of the 7-bit CCS parameter. Additional partial assignments may also be defined by using more signaling bits. In the extreme, the channelization codes in each time segment may be assigned to the terminals, e.g., in the same manner as the channelization codes are assigned to the terminals in each TTI for the CDM format.

One or more HS-SCCHs are sent simultaneously from a base station using channelization codes with a spreading factor of 128. The signaling for each terminal is scrambled with a UE identity for that terminal and sent on one of the HS-SCCHs using one of the SF=128 channelization codes allocated to the set of HS-SCCHs. In an exemplary embodiment, to reduce the channelization code space used for the set of HS-SCCHs, the signaling for terminals observing good channel conditions may be sent using channelization codes with a spreading factor of 256 instead of 128. These terminals may be terminals employing MIMO, which typically relies on higher SINR to achieve good performance. A higher code rate and/or a higher order modulation scheme may be used in combination with the larger spreading factor.

Figure 7:
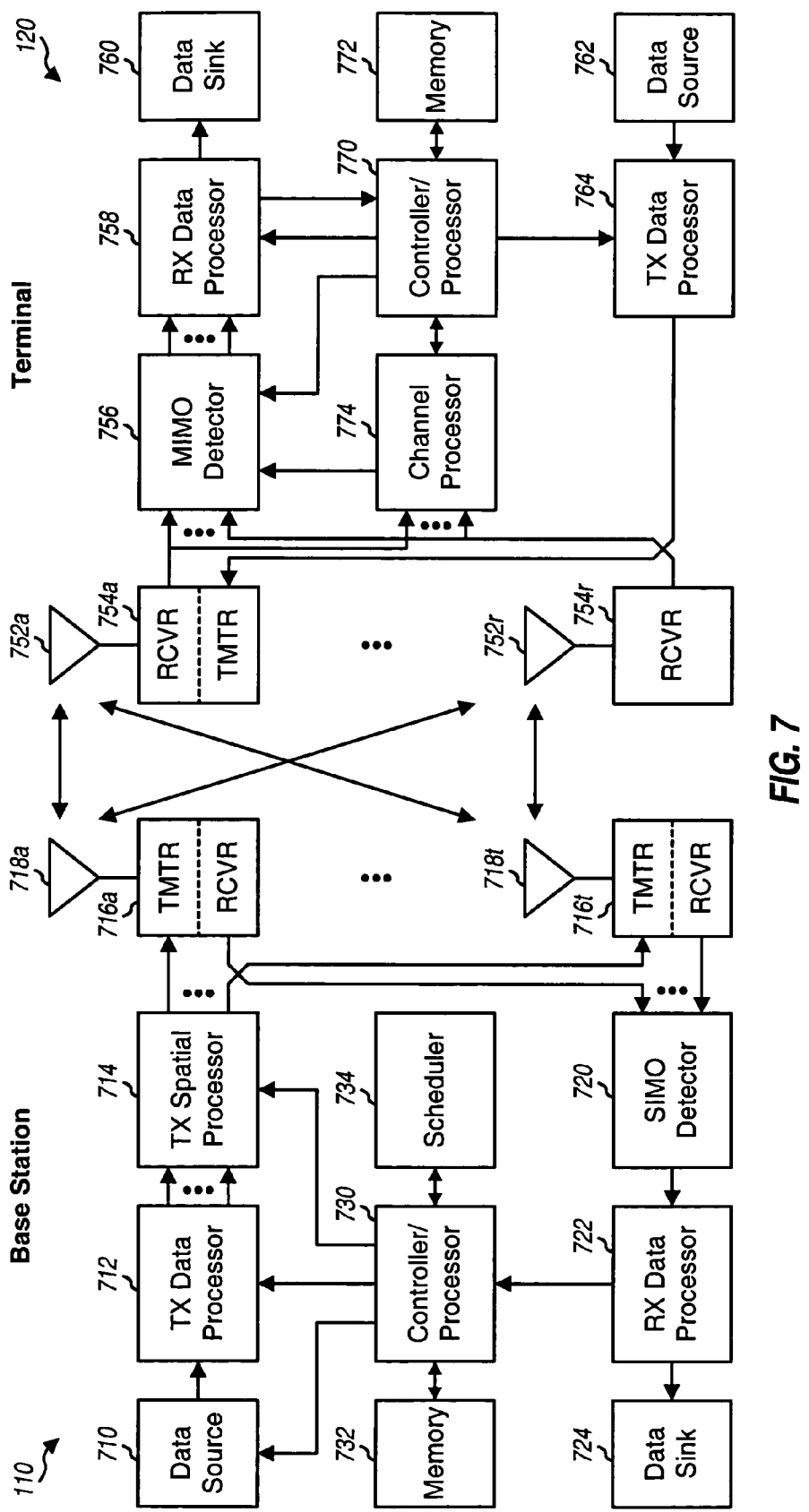
FIG. 7 shows a block diagram of a base station and a terminal.

FIG. 7 shows a block diagram of an exemplary embodiment of base station 110 and terminal 120. Base station 110 may be one of the base stations in FIG. 1. Terminal 120 may be one of the terminals in FIG. 1. In this exemplary embodiment, base station 110 is equipped with multiple (T) antennas 718a through 718t that may be used for data transmission and reception. Terminal 120 is equipped with multiple (R) antennas 752a through 752r that may be used for data reception and one antenna 752a that may be used for data transmission. Each antenna may be a physical antenna, a virtual antenna comprising an antenna array and an appropriate beam forming device or an antenna array with a fixed weighting network, etc.

At base station 110, a transmit (TX) data processor 712 receives and processes traffic data from a data source 710 and generates data symbols. TX data processor 712 also processes signaling from a controller 730 and generates signaling symbols. As used herein, a data symbol is a symbol for data, a signaling symbol is a symbol for signaling/control information, a pilot symbol is a symbol for pilot, and a symbol is typically a complex value. The data, signaling and pilot symbols may be modulation symbols from a modulation scheme such as PSK or QAM. For MIMO, TX data processor 712 may demultiplex the data, signaling and pilot symbols into multiple streams. TX data processor 712 may then perform CDMA modulation on each data symbol stream to generate a corresponding chip stream. A TX spatial processor 714 receives the chip streams from processor 712, performs spatial mapping on the chip streams, and provides T output streams to T transmitters (TMTR) 716a through 716t. Each transmitter 716 processes (e.g., converts to analog, filters, amplifies, and upconverts) its output stream and generates a downlink signal. T downlink signals from transmitters 716a through 716t are transmitted from antennas 718a through 718t, respectively.

At terminal 120, R antennas 752a through 752r receive the T downlink signals, and each antenna 752 provides a received signal to a respective receiver (RCVR) 754. Each receiver 754 processes (e.g., filters, amplifies, downconverts, digitizes, and demodulates) its received signal and provides input samples to a receive (RX) spatial processor 756 and a channel processor 774. Channel processor 774 estimates the channel response based on the received pilot (e.g., the TDM pilot) and provides a channel estimate. A MIMO detector 756 performs MIMO detection on the input samples with the channel estimate and provides detected samples. An RX data processor 758 further processes (e.g., descrambles, despreads, symbol demaps, deinterleaves and decodes) the detected samples and provides decoded data to a data sink 760. CDMA demodulation (e.g., descrambling and despreading) may be performed either after detection (e.g., for a MIMO transmission) or prior to detection (e.g., for a single-stream transmission).

Terminal 120 may send feedback information (e.g., ACKs/NAKs for received packets, CQIs, and so on) to base station 110. The feedback information and traffic data from a data source 762 are processed by a TX data processor 764, and further processed by a transmitter 754a to generate an uplink signal, which is transmitted via antenna 752a. At base station 110, the uplink signal is received by T antennas 718a through 718t, processed by receivers 716a through 716t, processed by a single-input multiple-output (SIMO) detector 720, and further processed by an RX data processor 722 to recover the feedback information and traffic data sent by terminal 120.

Controllers/processors 730 and 770 control the operation at base station 110 and terminal 120, respectively. Memories 732 and 772 store data and program codes for base station 110 and terminal 120, respectively.

Figure 8:
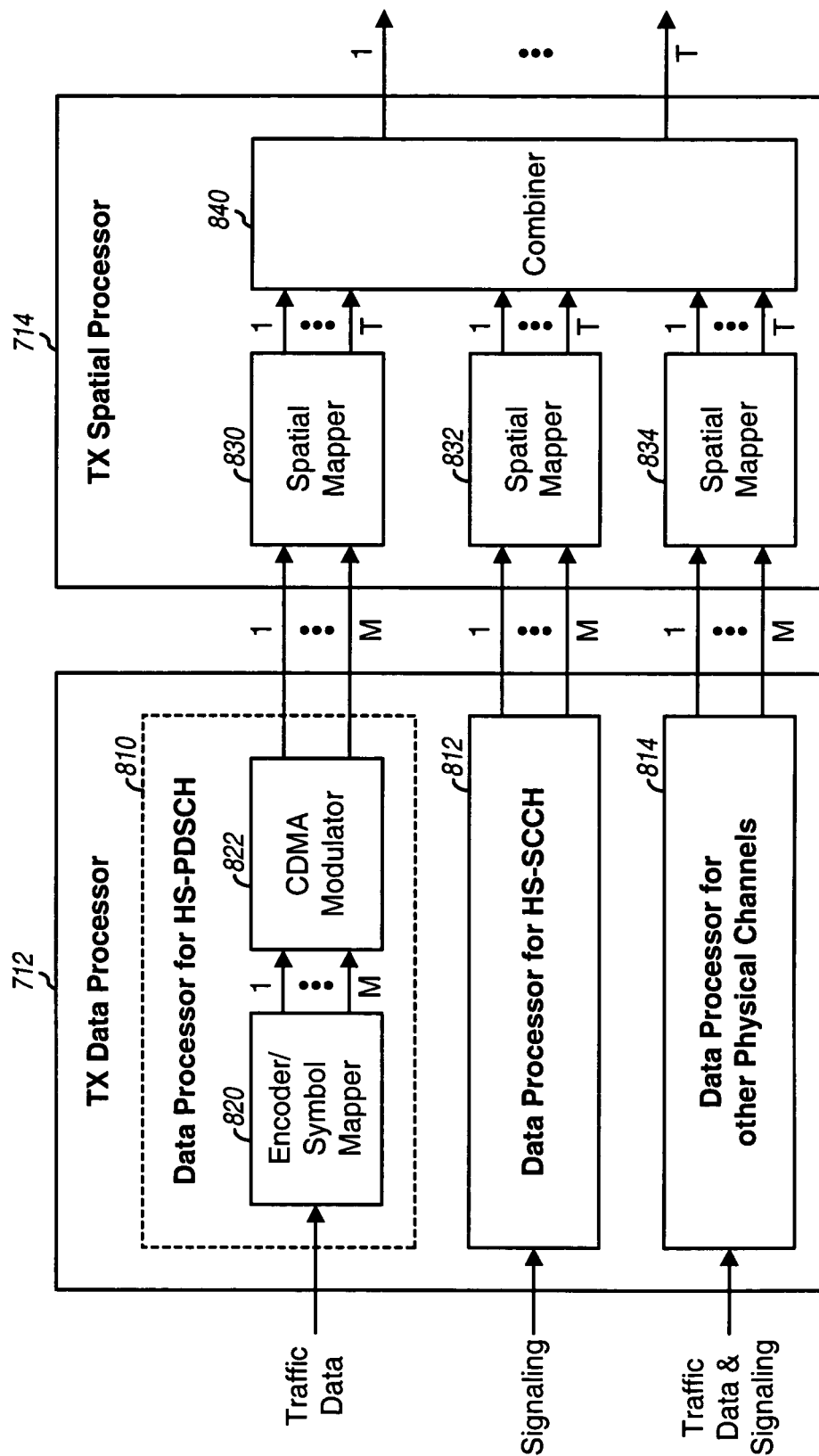
FIG. 8 shows a TX data processor and a TX spatial processor.

FIG. 8 shows a block diagram of an exemplary embodiment of TX data processor 712 and TX spatial processor 714 at base station 110 in FIG. 7. In this exemplary embodiment, TX data processor 712 includes a data processor 810 for the HS-PDSCH, a data processor 812 for the HS-SCCH, and a data processor 814 for other physical channels.

Within data processor 810 for the HS-PDSCH, an encoder/symbol mapper 820 receives traffic data for the terminals scheduled in the current TTI, processes (e.g., formats, encodes, interleaves, and symbol maps) each packet for each terminal to generate data symbols, and demultiplexes the data symbols for all terminals into M streams to be sent simultaneously. M packets may be sent on M streams, one packet on each stream, to facilitate successive interference cancellation. Alternatively, a packet may be demultiplexed and sent across multiple streams. A CDMA modulator 822 receives the M data symbol streams, maps the data symbols for each terminal to the time segment(s) assigned to that terminal, and multiplexes in pilot symbols. For each stream, CDMA modulator 822 spreads the data and pilot symbols with the channelization codes for HSDPA, scales the chips for each channelization code with a gain factor for that code, combines the scaled chips for all channelization codes, and scrambles the combined chips to generate a scrambled chip stream. Data processor 810 provides M chip streams for the HS-PDSCH. Data processor 812 processes the signaling for the HS-SCCH and provides M chip streams for the HS-SCCH. Data processor 814 processes traffic data and signaling for other physical channels and provides M chip streams for these physical channels.

TX spatial processor 714 includes a spatial mapper 830 for the HS-PDSCH, a spatial mapper 832 for the HS-SCCH, and a spatial mapper 834 for other physical channels. Spatial mapper 830 may perform matrix multiplication of the M chip streams for the HS-PDSCH with one or more spatial mapping matrices and provides T mapped chip streams. Spatial mapper 832 spatially maps the M chip streams for the HS-SCCH and provides T mapped chip streams, where M≤T. Spatial mapper 834 spatially maps the M chip streams for the other physical channels and provides T mapped chip streams. A combiner 840 combines the mapped chips for all physical channels and provides T output streams for T antennas. The combining may also be performed prior to the spatial mapping.

A spatial mapping matrix may be an orthonormal matrix (e.g., a Walsh matrix or a Fourier matrix), an identity matrix, or some other matrix. An orthonormal matrix can map a chip from one stream to all T antennas, which may provide spatial diversity. The identity matrix simply passes the chips. A single spatial mapping matrix may be used for all terminals and may be signaled or known a priori. A different spatial mapping matrix may also be used for each terminal for its assigned time segment(s), may be selected by the terminal or the base station to achieve good performance, and may be signaled (e.g., using the remaining values of the CCS parameter or some other signaling bits) or known a priori. The spatial mapping may be performed for all physical channels or for only some physical channels, e.g., the HS-PDSCH and/or HS-SCCH.

Figure 9:
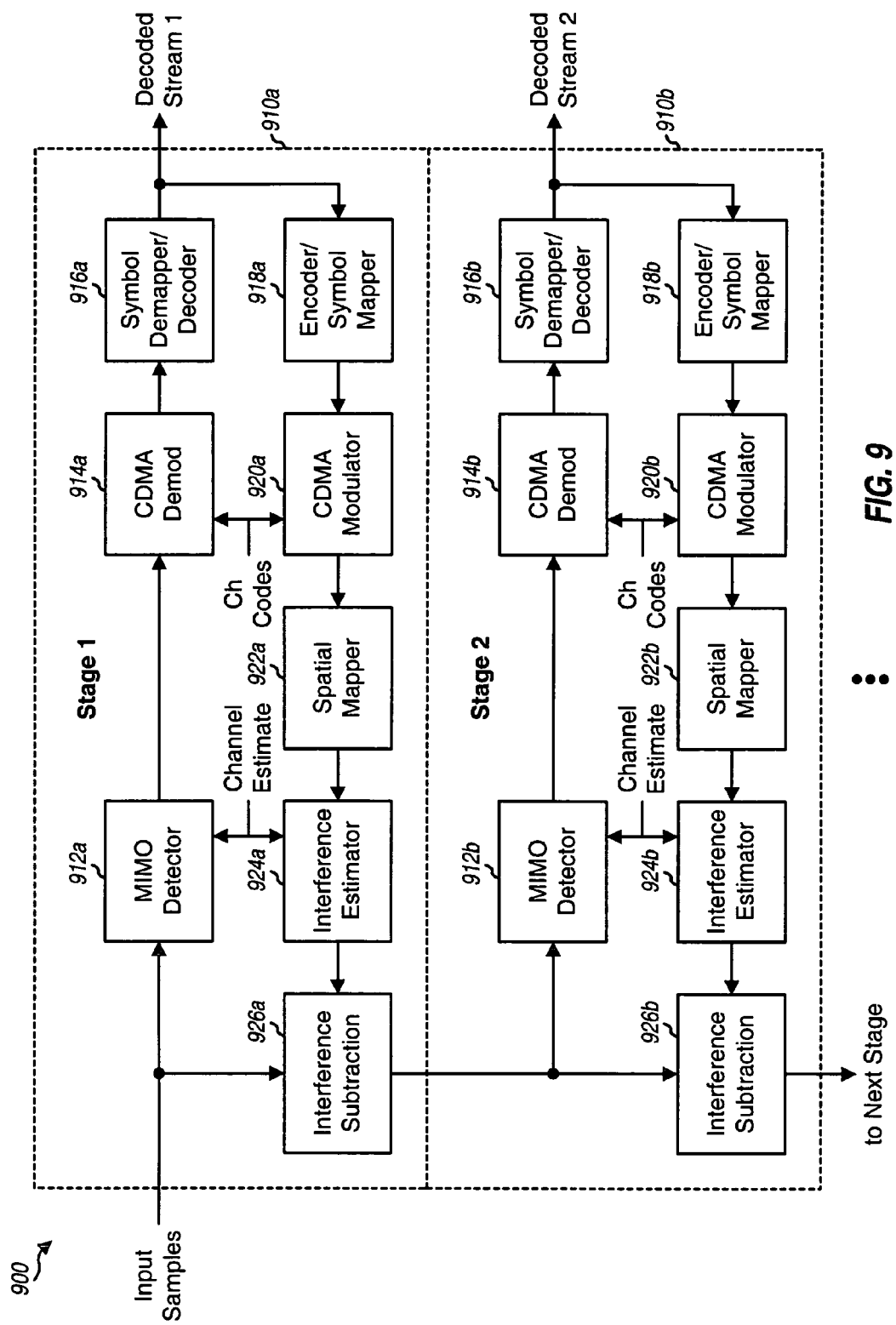
FIG. 9 shows an RX processor with successive interference cancellation.

FIG. 9 shows a block diagram of an RX processor 900 that performs successive interference cancellation (SIC). RX processor 900 is an exemplary embodiment of MIMO detector 756 and RX data processor 768 at terminal 120 in FIG. 7.

For the first stage 910a, a MIMO detector 912a receives R streams of input samples from receivers 754a through 754r for all time segment(s) assigned to terminal 120 in a TTI, performs MIMO detection on the input samples with the channel estimate, and provides detected samples for the first stream being recovered. MIMO detector 912a may implement MMSE, zero-forcing (ZF), or some other MIMO detection scheme, which may be able to perform detection without using a channel estimate. For example, a least mean square (LMS) scheme or some other scheme may be used to adapt the weights of an equalizer without using a channel estimate. A CDMA demodulator 914a performs descrambling and despreading on the detected samples with the channelization (Ch) codes assigned to terminal 120 for HSDPA and provides despread symbols. A symbol demapper/decoder 916a processes (e.g., computes LLRs, deinterleaves, and decodes) the despread symbols and provides a decoded packet for the first stream.

If the packet is decoded correctly, then an encoder/symbol mapper 918a encodes, interleaves and symbol maps the packet to regenerate the data symbols for the packet. A CDMA modulator 920a spreads the regenerated symbols with the channelization codes assigned to terminal 120 for HSDPA, scrambles the spread symbols, and provides regenerated chips for the first stream. A spatial mapper 922a maps the regenerated chips in the same manner performed by base station 110 and provides mapped chips. An interference estimator 924a estimates the interference due to the first stream based on the mapped chips and the channel estimate. An interference subtraction unit 926a subtracts the interference estimate from the input samples and provides input samples for the next stage.

Each subsequent stage receives the input samples from a preceding stage, processes the input samples in similar manner as the first stage, and provides a decoded packet for the stream being recovered by that stage. If the packet is decoded correctly, then the interference from the decoded packet is estimated and subtracted from the input samples for that stage to obtain input samples for the next stage.

As shown in FIG. 9, the amount of interference that can be estimated and canceled for each stream is determined by the channelization codes assigned to the terminal versus the channelization codes used for HSDPA. If the terminal is assigned all channelization codes for HSDPA, e.g., as shown in FIG. 4B, then the total interference for HSDPA may be estimated and canceled. The SINRs of subsequent streams may improve due to the canceled interference from prior streams.

As also shown in FIG. 9, the channel estimate is used for both MIMO detection and interference estimation. A higher quality channel estimate may be obtained based on the TDM pilot shown in FIG. 4B. In another exemplary embodiment, if a packet is decoded correctly for a given stream, then a data-based channel estimate may be derived for that stream based on the despread symbols from CDMA demodulator 914 and the regenerated symbols from encoder/symbol mapper 918. The data-based channel estimate may have higher quality than the pilot-based channel estimate and may be used in block 924 to derive a more accurate interference estimate.

Figure 10:
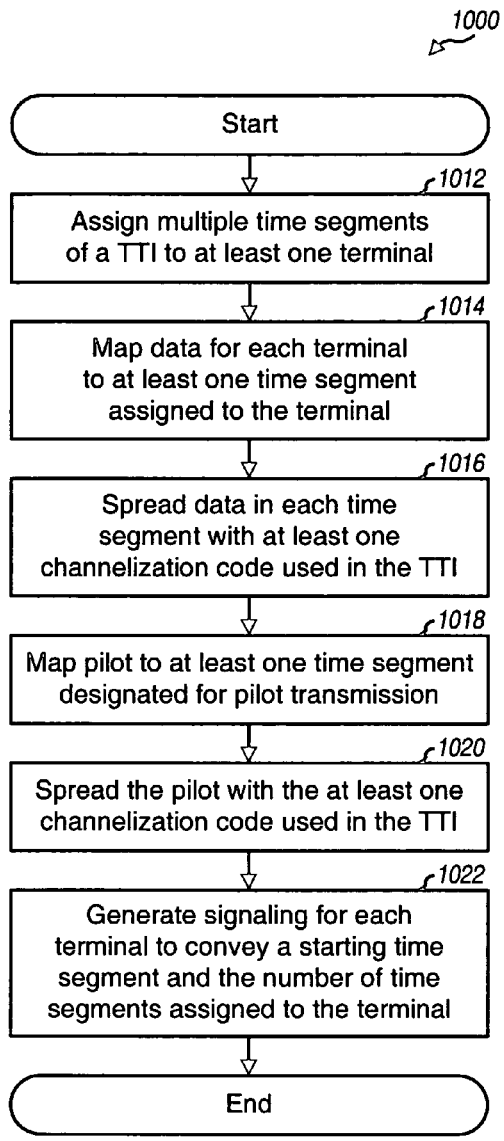
FIG. 10 shows a process performed by the base station for downlink transmission.

FIG. 10 shows an exemplary embodiment of a process 1000 performed by base station 110 for downlink transmission. Multiple time segments of a TTI are assigned to at least one terminal (block 1012). For full assignment, each time segment is assigned to one terminal, and each terminal is assigned at least one consecutive time segment in the TTI. For partial assignment, a time segment may be assigned to, and shared by, multiple terminals. A combination of full and partial assignments may also be used. The multiple time segments may be assigned to the at least one terminal in a sequential order determined by the number of time segments being assigned to each terminal. For example, the terminal with most number of time segments may be assigned first in the TTI, and the terminal with least number of time segments may be assigned last in the TTI. If MIMO is employed, then the multiple time segments may be assigned to the at least one terminal for each of multiple streams being sent simultaneously. Each terminal may be assigned at least one time segment across the multiple streams. Different terminals may also be assigned across streams, across channelization codes, or across both streams and channelization codes in a given time segment.

Data for each terminal is processed (e.g., encoded and symbol mapped) and then mapped to the at least one time segment assigned to the terminal (block 1014). The data in each time segment is spread with at least one channelization code used in the TTI (block 1016). Pilot may be mapped to at least one time segment designated for pilot transmission (block 1018) and spread with the at least one channelization code used in the TTI (block 1020). The pilot may be scaled to achieve equal transmit power for the pilot and the data for the at least one terminal. Signaling is generated for each terminal to convey, e.g., a starting time segment and the number of time segments assigned to the terminal (block 1022). The spread data for the at least one terminal and the pilot may be sent, e.g., on the HS-PDSCH. The signaling for each terminal may be sent, e.g., on the HS-SCCH.

Figure 11:
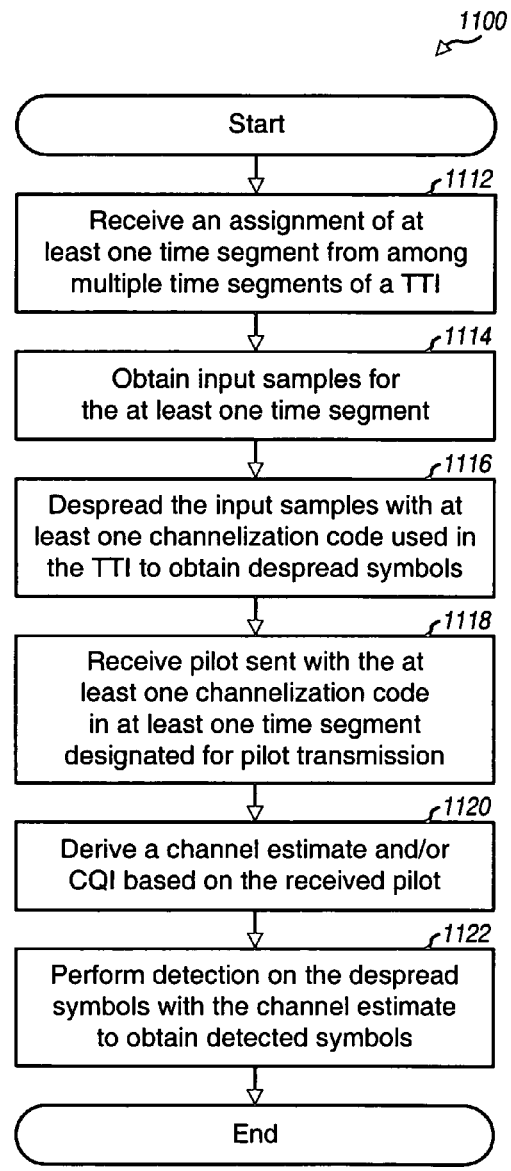
FIG. 11 shows a process performed by the terminal to receive the downlink transmission.

FIG. 11 shows an exemplary embodiment of a process 1100 performed by terminal 120 to receive downlink transmission. An assignment of at least one time segment from among multiple time segments of a TTI is received (block 1112). The assignment may be conveyed via signaling that indicates a starting time segment and the number of time segments in the assignment. Input samples for the at least one time segment are obtained (block 1114). The input samples are despread with at least one channelization code used in the TTI to obtain despread symbols (block 1116). Pilot sent with the at least one channelization code may be received from at least one time segment designated for pilot transmission (block 1118). A channel estimate and/or CQI may be derived based on the received pilot (block 1120). Detection may be performed on the despread symbols with the channel estimate to obtain detected symbols (block 1122).

If MIMO is employed, then the assignment of the at least one time segment may be for multiple streams sent simultaneously from multiple transmit antennas. Input samples for the at least one time segment may be obtained from multiple receive antennas. MIMO detection may be performed on the input samples to obtain detected samples for each of the multiple streams. The detected samples for each stream may be despread with the at least one channelization code to obtain despread symbols for the stream. The despread symbols for each stream may be decoded. Interference due to each stream may be estimated and canceled after successfully decoding the stream.

For clarity, the techniques have been described specifically for HSDPA in 3GPP. The techniques may also be used for other wireless communication networks that may implement other radio technologies. For example, the techniques may be used for a CDMA2000 1X network that implements IS-2000 Releases 0 and A, a CDMA2000 1xEV-DV network that implements IS-2000 Release C, a CDMA2000 1xEV-DO network that implements IS-856, and so on. cdma2000 uses a Forward Packet Data Channel (F-PDCH) and a Forward Packet Data Control Channel (F-PDCCH) that correspond to the HS-PDSCH and HS-SCCH, respectively. The format/ structure of the F-PDCH may be implemented, e.g., as shown in FIGS. 4A and 4B.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the exemplary embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An apparatus comprising:
   at least one processor to assign multiple time segments of a transmission time interval (TTI) comprising a single subframe to a plurality of terminals, to map data for each terminal to at least one time segment assigned to the terminal, to spread data in each of the multiple time segments with at least one channelization code used in the TTI, to map a pilot to at least one time segment designated for pilot transmission, and to spread the pilot with the at least one channelization code used in the TTI, the pilot comprising a predetermined data sequence associated with a base station and known by the plurality of terminals; and
   a memory coupled to the at least one processor.

2. The apparatus of claim 1, wherein the at least one processor assigns each of the multiple time segments to one of the plurality of terminals.

3. The apparatus of claim 1, wherein the at least one processor assigns each terminal with at least one consecutive time segment among the multiple time segments of the TTI.

4. The apparatus of claim 1, wherein the at least one processor assigns the multiple time segments to the plurality of terminals in an order determined by the number of time segments assigned to each terminal.

5. The apparatus of claim 1, wherein the at least one processor assigns the multiple time segments to the plurality of terminals in a sequential order based on the number of time segments assigned to each terminal, with a first terminal with most number of time segments being assigned first in the TTI and a last terminal with least number of time segments being assigned last in the TTI.

6. The apparatus of claim 1, wherein the at least one processor assigns the multiple time segments to the plurality of terminals in a sequential order based on the number of time segments assigned to each terminal, with a first terminal with least number of time segments being assigned first in the TTI and a last terminal with most number of time segments being assigned last in the TTI.

7. The apparatus of claim 1, wherein the at least one processor assigns at least one time segment such that each of the at least one time segment is assigned to one terminal, and assigns at least one other time segment such that each of the at least one other time segment is assigned to at least two terminals.

8. The apparatus of claim 1, wherein the at least one processor assigns at least one time segment such that each time segment is shared by at least two terminals with different channelization codes.

9. The apparatus of claim 1, wherein the at least one processor assigns the multiple time segments to the plurality of terminals for each of multiple streams being sent simultaneously.

10. The apparatus of claim 9, wherein the at least one processor assigns each terminal with at least one time segment across the multiple streams.

11. The apparatus of claim 1, wherein the at least one processor scales the pilot to achieve equal transmit power for the pilot and the data for the plurality of terminals.

12. The apparatus of claim 1, wherein the at least one processor generates signaling for each of the plurality of terminals to convey a starting time segment and the number of time segments assigned to the terminal.

13. The apparatus of claim 12, wherein the at least one processor sends the spread data for the plurality of terminals on a High Speed Physical Downlink Shared Channel (HS-PDSCH), and sends the signaling for each terminal on a Shared Control Channel for HS-PDSCH (HS-SCCH).

14. The apparatus of claim 1, wherein the at least one processor is configured to map the data for each terminal of the plurality of terminals and the pilot to time segments of a TTI of a High Speed Physical Downlink Shared Channel (HS-PDSCH).

15. A method comprising:
    assigning multiple time segments of a transmission time interval (TTI) comprising a single subframe to a plurality of terminals;
    mapping data for each terminal to at least one time segment assigned to the terminal;
    spreading data in each of the multiple time segments with at least one channelization code used in the TTI;
    mapping a pilot to at least one time segment designated for pilot transmission, the pilot comprising a predetermined data sequence associated with a base station and known by the plurality of terminals; and
    spreading the pilot with the at least one channelization code used in the TTI.

16. The method of claim 15, wherein the assigning the multiple time segments comprises assigning each of the multiple time segments to one of the plurality of terminals.

17. The method of claim 15, wherein the assigning the multiple time segments comprises assigning the multiple time segments to the plurality of terminals for each of multiple streams being sent simultaneously, each terminal being assigned at least one time segment across the multiple streams.

18. An apparatus comprising:
    means for assigning multiple time segments of a transmission time interval (TTI) comprising a single subframe to a plurality of terminals;
    means for mapping data for each terminal to at least one time segment assigned to the terminal;
    spreading data in each of the multiple time segments with at least one channelization code used in the TTI;
    means for mapping a pilot to at least one time segment designated for pilot transmission, the pilot comprising a predetermined data sequence associated with a base station and known by the plurality of terminals; and
    means for spreading the pilot with the at least one channelization code used in the TTI.

19. The apparatus of claim 18, wherein the means for assigning the multiple time segments comprises means for assigning each of the multiple time segments to one of the plurality of terminals.

20. The apparatus of claim 18, wherein the means for assigning the multiple time segments comprises means for assigning the multiple time segments to the plurality of terminals for each of multiple streams being sent simultaneously, each terminal being assigned at least one time segment across the multiple streams.

21. An apparatus comprising:
    at least one processor to assign multiple time segments of a first transmission time interval (TTI) comprising a single subframe to a first set of a plurality of terminals, each terminal in the first set being assigned at least one time segment in the first TTI, to assign multiple channelization codes to a second set of a plurality of terminals in a second TTI, each terminal in the second set being assigned at least one channelization code for the entire second TTI, to map a pilot to at least one time segment designated for pilot transmissions in each of the first TTI and the second TTI, and to spread the pilot in the second TTI using the at least one channelization code for the entire second TTI, the pilot comprising a predetermined data sequence associated with a base station and known by the plurality of terminals; and a memory coupled to the at least one processor.

22. The apparatus of claim 21, wherein each terminal in the first set is assigned the multiple channelization codes for the at least one time segment assigned to the terminal.

23. The apparatus of claim 21, wherein the at least one processor maps data for each terminal in the first set to the at least one time segment assigned to the terminal in the first TTI, and spreads data in each of the multiple time segments in the first TTI with the multiple channelization codes.

24. The apparatus of claim 21, wherein the at least one processor spreads data for each terminal in the second set with the at least one channelization code assigned to the terminal.

25. An apparatus comprising:
at least one processor to receive an assignment of at least one time segment from among multiple time segments of a transmission time interval (TTI) comprising a single subframe, to obtain input samples for the at least one time segment, to despread the input samples with at least one channelization code used in the TTI, to receive a pilot sent with the at least one channelization code in at least one time segment designated for pilot transmission, to despread the pilot using the at least one channelization code, and to derive a channel estimate based on the received pilot, wherein the subframes comprising the TTI are assigned to a plurality of terminals, and wherein the pilot comprises a predetermined data sequence associated with a base station and known by the plurality of terminals; and
a memory coupled to the at least one processor.

26. The apparatus of claim 25, wherein the at least one processor receives signaling indicative of a starting time segment and the number of time segments in the assignment.

27. The apparatus of claim 25, wherein the at least one processor derives channel quality indicator (CQI) based on the received pilot.

28. The apparatus of claim 25, wherein the at least one processor receives the assignment of the at least one time segment for multiple streams sent simultaneously from multiple transmit antennas, obtains input samples for the at least one time segment from multiple receive antennas, performs multiple-input multiple-output (MIMO) detection on the input samples to obtain detected samples for each of the multiple streams, and despreads the detected samples for each stream with the at least one channelization code to obtain despread symbols for the stream.

29. The apparatus of claim 28, wherein the at least one processor decodes the despread symbols for each stream and cancels interference due to each stream after successfully decoding the stream.

30. A method comprising:
receiving an assignment of at least one time segment from among multiple time segments of a transmission time interval (TTI) comprising a single subframe, wherein the subframes of the TTI are assigned to a plurality of terminals;
obtaining input samples for the at least one time segment;
despreading the input samples with at least one channelization code used in the TTI;

means for receiving a pilot sent with the at least one channelization code in at least one time segment designated for pilot transmission, the pilot comprising a predetermined data sequence associated with a base station and known by the plurality of terminals;
means for despreading the pilot using the at least one channelization code; and
means for deriving a channel estimate based on the received pilot.

31. The method of claim 30, the receiving the assignment comprises receiving the assignment of the at least one time segment for multiple streams sent simultaneously from multiple transmit antennas, the obtaining the input samples comprises obtaining input samples for the at least one time segment from multiple receive antennas, and the method further comprises performing multiple-input multiple-output (MIMO) detection on the input samples to obtain detected samples for each of the multiple streams, the despreading the input samples comprises despreading the detected samples for each stream with the at least one channelization code to obtain despread symbols for the stream.

32. The method of claim 31, further comprising:
decoding the despread symbols for each stream; and
canceling interference due to each stream after successfully decoding the stream.

33. An apparatus comprising:
means for receiving an assignment of at least one time segment from among multiple time segments of a transmission time interval (TTI) comprising a single subframe, wherein the subframes comprising the TTI are assigned to a plurality of terminals;
means for obtaining input samples for the at least one time segment;
means for despreading the input samples with at least one channelization code used in the TTI;
means for receiving a pilot sent with the at least one channelization code in at least one time segment designated for pilot transmission, the pilot comprising a predetermined data sequence associated with a base station and known by the plurality of terminals;
means for despreading the pilot using the at least one channelization code; and
means for deriving a channel estimate based on the received pilot.

34. The apparatus of claim 33, the means for receiving the assignment comprises means for receiving the assignment of the at least one time segment for multiple streams sent simultaneously from multiple transmit antennas, the means for obtaining the input samples comprises means for obtaining input samples for the at least one time segment from multiple receive antennas, the apparatus further comprises means for performing multiple-input multiple-output (MIMO) detection on the input samples to obtain detected samples for each of the multiple streams, the means for despreading the input samples comprises means for despreading the detected samples for each stream with the at least one channelization code to obtain despread symbols for the stream.

35. The apparatus of claim 34, further comprising:
means for decoding the despread symbols for each stream; and
means for canceling interference due to each stream after successfully decoding the stream.

36. A computer program product residing on a non-transitory processor-readable medium and comprising instructions configured to cause a processor to:

assign multiple time segments of a transmission time interval (TTI) comprising a single subframe to a plurality of terminals;

map data for each terminal to at least one time segment assigned to the terminal; spread data in each of the multiple time segments with at least one channelization code used in the TTI;

map a pilot to at least one time segment designated for pilot transmission, the pilot comprising a predetermined data sequence associated with a base station and known by the plurality of terminals; and spread the pilot with the at least one channelization code used in the TTI.

37. The computer program product of claim 36, wherein the instructions configured to cause the processor to assign are configured to cause the processor to assign each of the multiple time segments to one of the plurality of terminals.

38. The computer program product of claim 36, wherein the instructions configured to cause the processor to assign are configured to cause the processor to assign each terminal with at least one consecutive time segment among the multiple time segments of the TTI.

39. The computer program product of claim 36, wherein instructions configured to cause the processor to assign are configured to cause the processor to assign the multiple time segments to the plurality of terminal in an order determined by the number of time segments assigned to each terminal.

40. The computer program product of claim 36, wherein the instructions configured to cause the processor to assign are configured to cause the processor to assign the multiple time segments to the plurality of terminals in a sequential order based on the number of time segments assigned to each terminal, with a first terminal with most number of time segments being assigned first in the TTI and a last terminal with least number of time segments being assigned last in the TTI.

41. The computer program product of claim 36, wherein the instructions configured to cause the processor to assign are configured to cause the processor to assign the multiple time segments to the plurality of terminals in a sequential order based on the number of time segments assigned to each terminal, with a first terminal with least number of time segments being assigned first in the TTI and a last terminal with most number of time segments being assigned last in the TTI.

42. The computer program product of claim 36, wherein the instructions configured to cause the processor to assign are configured to cause the processor to assign at least one time segment such that each of the at least one time segment is assigned to one terminal, and assigns at least one other time segment such that each of the at least one other time segment is assigned to at least two terminals.

43. The computer program product of claim 36, wherein the instructions configured to cause the processor to assign are configured to cause the processor to assign at least one time segment such that each time segment is shared by at least two terminals with different channelization codes.

44. The computer program product of claim 36, wherein the instructions configured to cause the processor to assign are configured to cause the processor to assign the multiple time segments to the plurality of terminals for each of multiple streams being sent simultaneously.

45. The computer program product of claim 44, wherein the instructions configured to cause the processor to assign are configured to cause the processor to assign each terminal with at least one time segment across the multiple streams.

46. The computer program product of claim 36, further comprising instructions configured to cause the processor to scale the pilot to achieve equal transmit power for the pilot and the data for the plurality of terminals.

47. The computer program product of claim 36, further comprising instructions configured to cause the processor to generate signaling for each of the plurality of terminals to convey a starting time segment and the number of time segments assigned to the terminal.

48. The computer program product of claim 47, further comprising instructions configured to cause the processor to send the spread data for the plurality of terminals on a High Speed Physical Downlink Shared Channel (HS-PDSCH), and send the signaling for each terminal on a Shared Control Channel for HS-PDSCH (HS-SCCH).

49. The computer program product of claim 48, wherein the instructions configured to cause the processor to receive are configured to cause the processor to receive signaling indicative of a starting time segment and the number of time segments in the assignment.

50. A computer program product residing on a non-transitory processor-readable medium and comprising instructions configured to cause a processor to:

receive an assignment of at least one time segment from among multiple time segments of a transmission time interval (TTI) comprising a single subframe, wherein the subframes comprising the TTI are assigned to a plurality of terminals;

obtain input samples for the at least one time segment;

despread the input samples with at least one channelization code used in the TTI;

receive a pilot sent with the at least one channelization code in at least one time segment designated for pilot transmission, the pilot comprising a predetermined data sequence associated with a base station and known by the plurality of terminals;

despread the pilot using the at least one channelization code; and derive a channel estimate based on the received pilot.

51. The computer program product of claim 50, further comprising instructions configured to cause the processor to derive channel quality indicator (CQI) based on the received pilot.

52. The computer program product of claim 51, further comprising instructions configured to cause the processor to decode the despread symbols for each stream and cancel interference due to each stream after successfully decoding the stream.

53. The computer program product of claim 50, wherein the instructions configured to cause the processor to receive are configured to cause the processor to receive the assignment of the at least one time segment for multiple streams sent simultaneously from multiple transmit antennas, the instructions configured to cause the processor to obtain are configured to cause the processor to obtain input samples for the at least one time segment from multiple receive antennas, the computer program processor further comprising instructions configured to cause the processor to:

perform multiple-input multiple-output (MIMO) detection on the input samples to obtain detected samples for each of the multiple streams; and despread the detected samples for each stream with the at least one channelization code to obtain despread symbols for the stream.

* * * * *